US010760840B2

(12) United States Patent
Ludwig et al.

(10) Patent No.: US 10,760,840 B2
(45) Date of Patent: Sep. 1, 2020

(54) DUAL-COMPRESSOR REFRIGERATION UNIT

(71) Applicant: Carrier Corporation, Palm Beach Gardens, FL (US)

(72) Inventors: Tyler Joseph Ludwig, Liverpool, NY (US); Tathagata De, Charlotte, NC (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 70 days.

(21) Appl. No.: 15/773,194

(22) PCT Filed: Oct. 25, 2016

(86) PCT No.: PCT/US2016/058653
§ 371 (c)(1),
(2) Date: May 3, 2018

(87) PCT Pub. No.: WO2017/083095
PCT Pub. Date: May 18, 2017

(65) Prior Publication Data
US 2018/0320945 A1    Nov. 8, 2018

Related U.S. Application Data

(60) Provisional application No. 62/258,868, filed on Nov. 23, 2015, provisional application No. 62/252,670, filed on Nov. 9, 2015.

(51) Int. Cl.
*F25B 49/02*    (2006.01)
*F25B 1/047*    (2006.01)
(Continued)

(52) U.S. Cl.
CPC ............ *F25B 49/022* (2013.01); *F25B 1/047* (2013.01); *F25B 25/005* (2013.01); *F25B 39/00* (2013.01);
(Continued)

(58) Field of Classification Search
CPC ........ F25B 1/047; F25B 25/005; F25B 39/00; F25B 49/022; F25B 2339/0242;
(Continued)

(56) References Cited

U.S. PATENT DOCUMENTS

| 4,124,177 A | 11/1978 | Timmerman |
| 4,152,902 A * | 5/1979 | Lush ...................... F04C 28/02 236/1 E |

(Continued)

FOREIGN PATENT DOCUMENTS

| CN | 1265188 A | 8/2000 |
| CN | 1239859 C | 2/2006 |

(Continued)

OTHER PUBLICATIONS

International Search Report from the International Searching Authority for International Application No. PCT/US2016/058653; Date of Completion: Jan. 20, 2017; dated Jan. 30, 2017; 6 Pages.

(Continued)

*Primary Examiner* — Jonathan Bradford
(74) *Attorney, Agent, or Firm* — Cantor Colburn LLP

(57) ABSTRACT

A refrigeration unit may include a first compressor constructed and arranged to compress a first refrigerant, and a second compressor constructed and arranged to compress a second refrigerant. A first condenser of the refrigeration unit is operatively coupled to the first compressor, and a second condenser is operatively coupled to the second compressor. An evaporator of the refrigeration unit is constructed and arranged to flow the first and second refrigerants received (Continued)

from the respective first and second condensers for chilling a heat transfer fluid. A controller of the refrigeration unit includes a computer processor and a storage media for executing a pre-programmed algorithm for initiating the second compressor when a predetermined crossover frequency of the first compressor is reached as a system load increases.

16 Claims, 2 Drawing Sheets

(51) Int. Cl.
*F25B 25/00* (2006.01)
*F25B 39/00* (2006.01)

(52) U.S. Cl.
CPC ... *F25B 2339/0242* (2013.01); *F25B 2400/06* (2013.01); *F25B 2500/26* (2013.01); *F25B 2600/025* (2013.01); *F25B 2600/0251* (2013.01); *F25B 2600/0253* (2013.01); *Y02B 30/741* (2013.01)

(58) Field of Classification Search
CPC ............ F25B 2400/06; F25B 2400/075; F25B 2500/26; F25B 2600/0251; F25B 2600/0253
See application file for complete search history.

(56) References Cited

U.S. PATENT DOCUMENTS

| | | | |
|---|---|---|---|
| 4,210,957 A | 7/1980 | Spethmann | |
| 4,494,006 A | 1/1985 | Staroselsky et al. | |
| 5,108,263 A | 4/1992 | Blotenberg | |
| 5,123,256 A | 6/1992 | Oltman | |
| 5,343,384 A | 8/1994 | Fisher et al. | |
| 5,347,467 A | 9/1994 | Staroselsky et al. | |
| 5,875,637 A | 3/1999 | Paetow | |
| 7,676,283 B2 | 3/2010 | Liepold et al. | |
| 8,250,879 B2* | 8/2012 | MacBain | F25B 1/00 62/335 |
| 8,291,720 B2* | 10/2012 | Hartman | F04D 27/0261 62/228.5 |
| 2004/0231357 A1 | 11/2004 | Matsuoka et al. | |
| 2005/0091998 A1 | 5/2005 | Cho et al. | |
| 2005/0160761 A1 | 7/2005 | Taras et al. | |
| 2005/0223723 A1 | 10/2005 | Crane et al. | |
| 2007/0107449 A1 | 5/2007 | Crane et al. | |
| 2008/0210317 A1 | 9/2008 | Conry | |
| 2011/0048046 A1 | 3/2011 | Sommer et al. | |
| 2015/0135751 A1* | 5/2015 | Tamaki | F25B 49/022 62/196.1 |

FOREIGN PATENT DOCUMENTS

| | | |
|---|---|---|
| CN | 101646911 A | 2/2010 |
| CN | 102124286 A | 7/2011 |
| CN | 202101372 U | 1/2012 |
| CN | 102434941 A | 5/2012 |
| EP | 2325576 A1 | 5/2011 |
| WO | 9905463 A1 | 2/1999 |
| WO | 2008100255 A1 | 8/2008 |

OTHER PUBLICATIONS

Written Opinion from the International Searching Authority for International Application No. PCT/US2016/058653; International Filing Date: Oct. 25, 2016; dated Jan. 30, 2017; 6 Pages.
Chinese Office Action for Chinese Application No. 201680065200.2; dated Dec. 24, 2019; 6 Pages.
Machine Translation of Russian Office Action from the Federal Service for Intellectual Property (FIPS) for Russian Application No. 2018115537/06(024180); Application Filing Date: Oct. 25, 2016; dated Mar. 6, 2020; 8 Pages.
Russian Office Action from the Federal Service for Intellectual Property (FIPS) for Russian Application No. 2018115537/06(024180); Application Filing Date: Oct. 25, 2016; dated Mar. 6, 2020; 7 Pages.

* cited by examiner

DUAL-COMPRESSOR REFRIGERATION UNIT

CROSS REFERENCE TO RELATED APPLICATIONS

This application is a National Stage application of PCT/US2016/058653, filed Oct. 25, 2016, which claims the benefit of U.S. Provisional Application No. 62/258,868, filed Nov. 23, 2015 and U.S. Provisional Application No. 62/252,670, filed Nov. 9, 2015, all of which are incorporated by reference in their entirety herein.

BACKGROUND

The present disclosure relates to refrigeration units and, more particularly, to dual-compressor refrigeration units.

Refrigeration units may include dual compressors with each compressor designed to compress a respective refrigerant. The refrigerants may flow through respective condensers prior to flowing through an evaporator or chiller for chilling a common heat transfer fluid that may be water. The chilled water may then flow to any variety of locations that may be remote to cool any variety of components or environments. One example of such dual-compressor refrigeration units may be part of a heating and cooling system for high-rise buildings. Improvements in operating efficiency of such dual-compressor refrigeration units are desirable.

SUMMARY

A method of operating a dual-compressor refrigeration unit according to one, non-limiting, embodiment of the present disclosure includes increasing a first compressor speed as load demand increases; and initializing a second compressor when a frequency reaches a pre-established crossover frequency of the first compressor.

Additionally to the foregoing embodiment, the crossover frequency is dynamically controlled and computed based on a capacity and a maximum speed of the first compressor.

In the alternative or additionally thereto, in the foregoing embodiment, the crossover frequency is determined such that short cycling of the second compressor will not occur.

In the alternative or additionally thereto, in the foregoing embodiment, the crossover frequency is determined through execution of an algorithm established in-part through an efficiency analysis of the dual-compressor refrigeration unit.

In the alternative or additionally thereto, in the foregoing embodiment, the crossover frequency is dynamically controlled and computed based on a capacity and a maximum speed of the first compressor.

In the alternative or additionally thereto, in the foregoing embodiment, the second compressor is initialized before the first compressor reaches a maximum speed.

In the alternative or additionally thereto, in the foregoing embodiment, the first compressor is associated with a first condenser, and the second compressor is associated with a second condenser.

In the alternative or additionally thereto, in the foregoing embodiment, a first heat transfer fluid flows from the first condenser and into a common evaporator for chilling a second heat transfer fluid, and a third heat transfer fluid flows from the second condenser and into a common evaporator for chilling the second heat transfer fluid.

In the alternative or additionally thereto, in the foregoing embodiment, the first and third heat transfer fluids are a refrigerant and the second heat transfer fluid is liquid water.

In the alternative or additionally thereto, in the foregoing embodiment, the dual-compressor refrigeration unit includes a controller having a computer processor and a storage media for processing a pre-programmed algorithm associated with the control of the first and second compressors.

In the alternative or additionally thereto, in the foregoing embodiment, the first and second compressors do not run at respective minimum speeds when both are running.

In the alternative or additionally thereto, in the foregoing embodiment, the method includes turning off the second compressor when the frequency falls below a pre-determined minimum frequency for a pre-determined amount of time.

A refrigeration unit according to another, non-limiting, embodiment includes a first compressor constructed and arranged to compress a first refrigerant; a second compressor constructed and arranged to compress a second refrigerant; a first condenser operatively coupled to the first compressor; a second condenser operatively coupled to the second compressor; an evaporator constructed and arranged to flow the first and second refrigerants received from the respective first and second condensers for chilling a heat transfer fluid; and a controller including a computer processor and a storage media for executing a pre-programmed algorithm for initializing the second compressor when a predetermined crossover frequency of the first compressor is reached as a system load increases.

Additionally to the foregoing embodiment, the controller is configured to prevent the first and second compressors from running at respective minimum speeds when both compressors are initialized.

In the alternative or additionally thereto, in the foregoing embodiment, the crossover frequency is dynamically controlled and computed by the controller based on a capacity and a maximum speed of the first compressor.

In the alternative or additionally thereto, in the foregoing embodiment, the crossover frequency is determined such that short cycling of the second compressor will not occur.

In the alternative or additionally thereto, in the foregoing embodiment, the crossover frequency is determined through execution of an algorithm established in-part through an efficiency analysis of the dual-compressor refrigeration unit.

In the alternative or additionally thereto, in the foregoing embodiment, the crossover frequency is dynamically controlled and computed by the controller based on a capacity and a maximum speed of the first compressor.

In the alternative or additionally thereto, in the foregoing embodiment, the controller is configured such that the second compressor is initialized before the first compressor reaches a maximum speed.

In the alternative or additionally thereto, in the foregoing embodiment, the first and second compressors comprise a screw-type.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
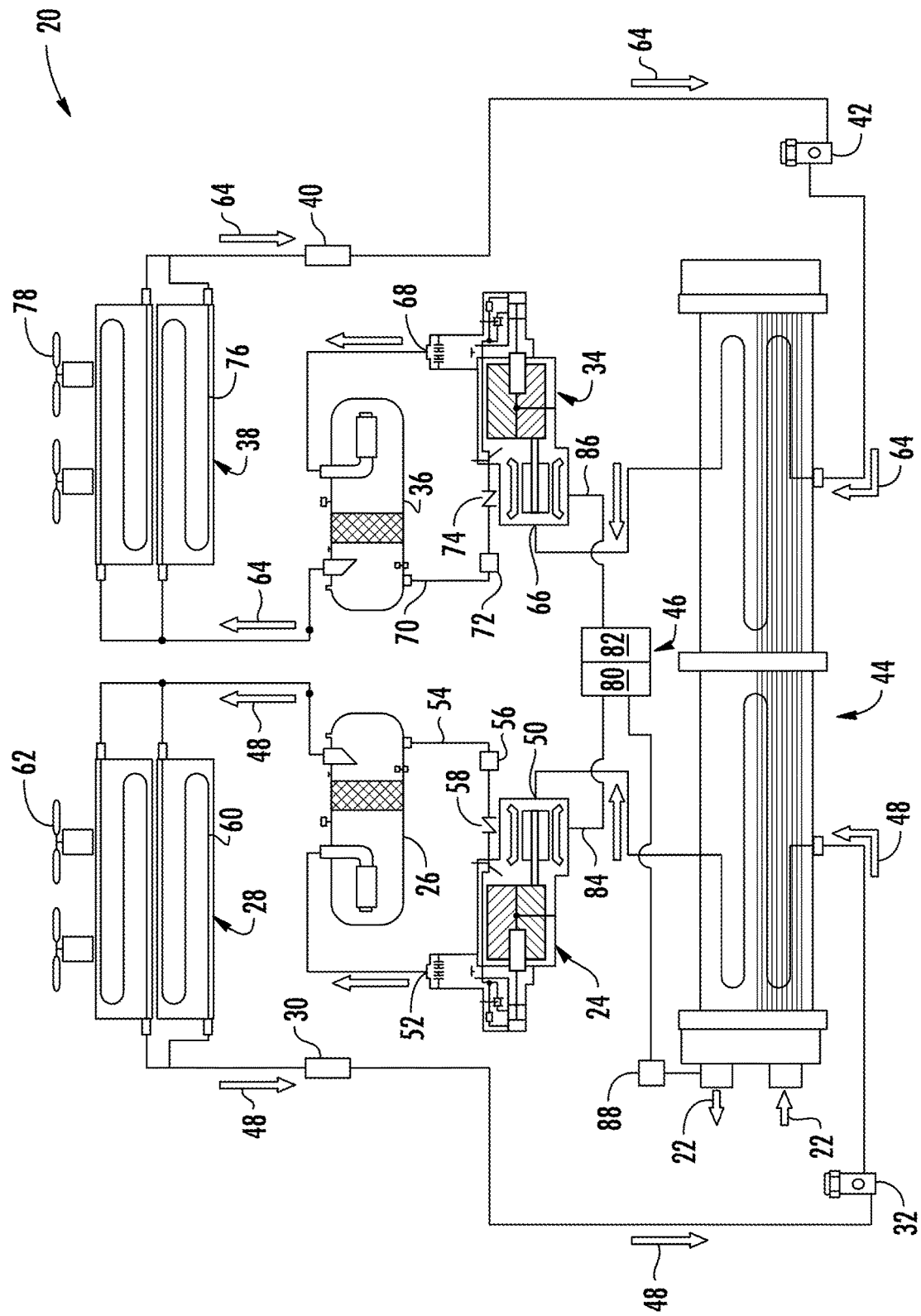
FIG. 1 is a schematic of a dual-compressor refrigeration unit as one, non-limiting, exemplary embodiment of the present disclosure.

Referring to FIG. 1, a dual-compressor refrigeration unit 20 is illustrated that may chill a heat transfer fluid (e.g., liquid water, see arrows 22) for, as one non-limiting example, the cooling of various environments and/or components (not shown) that may be remotely located. The dual-compressor refrigeration unit 20 may include a first compressor 24, a first oil separator 26, a first condenser 28, a first filter/drier 30, a first expansion valve 32, a second compressor 34, a second oil separated 36, a second condenser 38, a second filter/drier 40, a second expansion valve 42, an evaporator 44 (e.g., chiller), and a controller 46. As one, non-limiting, example, the first and second compressors 24, 34 may be of a screw-type.

Operation of the dual-compressor refrigeration unit 20 may best be understood by starting at the first compressor 24, where a first suction gas (i.e., first heat transfer fluid that may be a first refrigerant, see arrows 48) enters the first compressor 24 at a suction port 50 and is compressed to a higher temperature and pressure. The pressurized first refrigerant 48, in a gas state, is emitted from the compressor 24 at an outlet port 52 and may then flow into the first oil separator 26 adapted to separate the pressurized first refrigerant 48 from an oil. The oil, in a liquid state, may then drain from the oil separator 26, through a line 54 that may be interposed by an oil filter 56, a check valve 58, and back to the first compressor 24.

The first refrigerant 48 emitted from the first oil separator 26 may then enter and flow through an arrangement of tubes 60 of the first condenser 28. Air flowing across a plurality of condenser coil fins (not shown) and the tubes 60 cools the first refrigerant 48, in the gas state, to its saturation temperature. The air flow across the fins and tubes 60 of the first condenser 28 may be facilitated by one or more fans 62 of the first condenser 28. The condenser fans 62 may be driven by respective condenser fan motors and/or by any variety of mechanical means.

By removing latent heat, the first refrigerant 48 (in the gas state) within the condenser tubes 60 condenses to a high pressure and high temperature liquid and passes through the filter-dryer 30 that keeps the refrigerant 48 clean and dry. From the filter-dryer 30, the first refrigerant 48 flows through the expansion valve 32 and into the evaporator 44. As the first refrigerant 48 in liquid state passes through the orifices of the expansion valve 32, some of the liquid vaporizes into a gas (i.e., flash gas). The first refrigerant 48, in both gas and liquid states, flows over heat transfer surfaces carried by any variety of elements (not shown) within the evaporator 44 that separates the first and second refrigerants 48, 64 and the heat transfer fluid 22 from each other. As the first refrigerant 48 flows over the heat transfer surfaces, the heat transfer fluid 22 flows over opposite surfaces of the elements. Heat is then transferred from the fluid 22, through the elements, and is absorbed by the first refrigerant 48. As heat is absorbed, the remaining first refrigerant 48 in liquid state is typically vaporized.

Also during operation of the dual-compressor refrigeration unit 20, a second heat transfer fluid that may be a second refrigerant in a gas state (see arrows 64), enters the second compressor 34 at a suction port 66 and is compressed to a higher temperature and pressure. The pressurized second refrigerant 64, in the gas state, is emitted from the second compressor 34 at an outlet port 68 and may then flow into the second oil separator 36 adapted to separate the pressurized second refrigerant 64 from an oil. The oil, in a liquid state, may then drain from the second oil separator 36, through a line 70 that may be interposed by an oil filter 72, a check valve 74, and back to the second compressor 34.

The second refrigerant 64 emitted from the second oil separator 34 may then enter and flow through an arrangement of tubes 76 of the second condenser 38. Air flowing across a plurality of condenser coil fins (not shown) and the tubes 76 cools the second refrigerant 64, in the gas state, to its saturation temperature. The air flow across the fins and tubes 76 of the second condenser 38 may be facilitated by one or more fans 78 of the second condenser 38. The condenser fans 78 may be driven by respective condenser fan motors and/or by any variety of mechanical means.

By removing latent heat, the second refrigerant 64 (in the gas state) within the condenser tubes 76 condenses to a high pressure and high temperature liquid and passes through the filter-dryer 40 that keeps the refrigerant 64 clean and dry. From the filter-dryer 40, the second refrigerant 64 flows through the second expansion valve 42 and into the evaporator 44. As the second refrigerant 64, in liquid state, passes through the orifices of the expansion valve 42, some of the liquid vaporizes into a gas (i.e., flash gas). The second refrigerant 64, in both gas and liquid states, flows over heat transfer surfaces carried by any variety of elements (not shown) within the evaporator 44 that separates the first and second refrigerants 48, 64 and the heat transfer fluid 22 from each other. As the second refrigerant 64 flows over the heat transfer surfaces, the heat transfer fluid 22 flows over opposite surfaces of the elements. Heat is then transferred from the fluid 22, through the elements, and is absorbed by the second refrigerant 64. As heat is absorbed, the remaining second refrigerant 64 in liquid state is typically vaporized.

The controller 46 may be electronic and is configured to at least monitor and control the first and second compressors 24, 36 over respective pathways 84, 86. The controller 46 may include a computer processor 80 (e.g., microprocessor) and a computer readable storage media 82. The processor 80 is configured to execute an algorithm established to initiate the second compressor 34 when a speed of the first compressor 24 surpasses a pre-determined crossover speed with increasing refrigeration load. The speed may generally be represented by a frequency and the crossover speed may be represented by a crossover frequency. More specifically, the term 'crossover frequency' refers to the point at which the measured speed (in frequency, Hz) of the first compressor eclipses the algorithm's calculated speed for adding the second compressor. That is, the frequency of the running compressor crosses over the threshold established for adding another compressor. The term 'crossover frequency' is therefore used to describe the calculated frequency by the controller 46. Frequency is equivalent to revolutions per minute (RPM), where RPM is equal to the frequency value expressed in Hertz time sixty (60).

Execution of the algorithm by the controller 46 may further prevent the first compressor 24 from reaching maximum speed before the second compressor 34 is initialized, and prevents the first and second compressors 24, 34 from operating at minimum speeds when both are running. The controller 46 also function to stop the second compressor 34 when the electrical circuit providing electrical power to the first and second compressors 24, 34 falls below a pre-determined minimum frequency for a pre-determined duration of time.

The crossover frequency may be dynamically controlled and computed based on a maximum speed of the first compressor 24, and is determined, at least in-part, such that short cycling of the second compressor will not occur. That is, the crossover frequency of the first compressor 24 is established at a speed that will not cause the second compressor to frequently initialize and turn-off excessively. More specifically, the crossover frequency may be determined through an efficiency analysis of any particular refrigeration unit 20 and a determination of resulting synchronized first and second compressor speeds. The resulting operation of two circuits (i.e., two compressors) running is synchronized based on capacity percent and may not be based on speed. Thus, the capacity may be evenly split (i.e., estimated) between two compressors regardless of whether each compressor is capable of delivering the same maximum capacity. The efficiency analysis or calculation may not be performed by the system 20, itself, but may be established during the development of the algorithm. During normal operation of the system 20, inputs to the controller for execution of the algorithm include compressor speed(s) and the evaporator outlet temperature of the heat transfer fluid 22 (e.g., water) measured by a temperature sensor 88.

Figure 2:
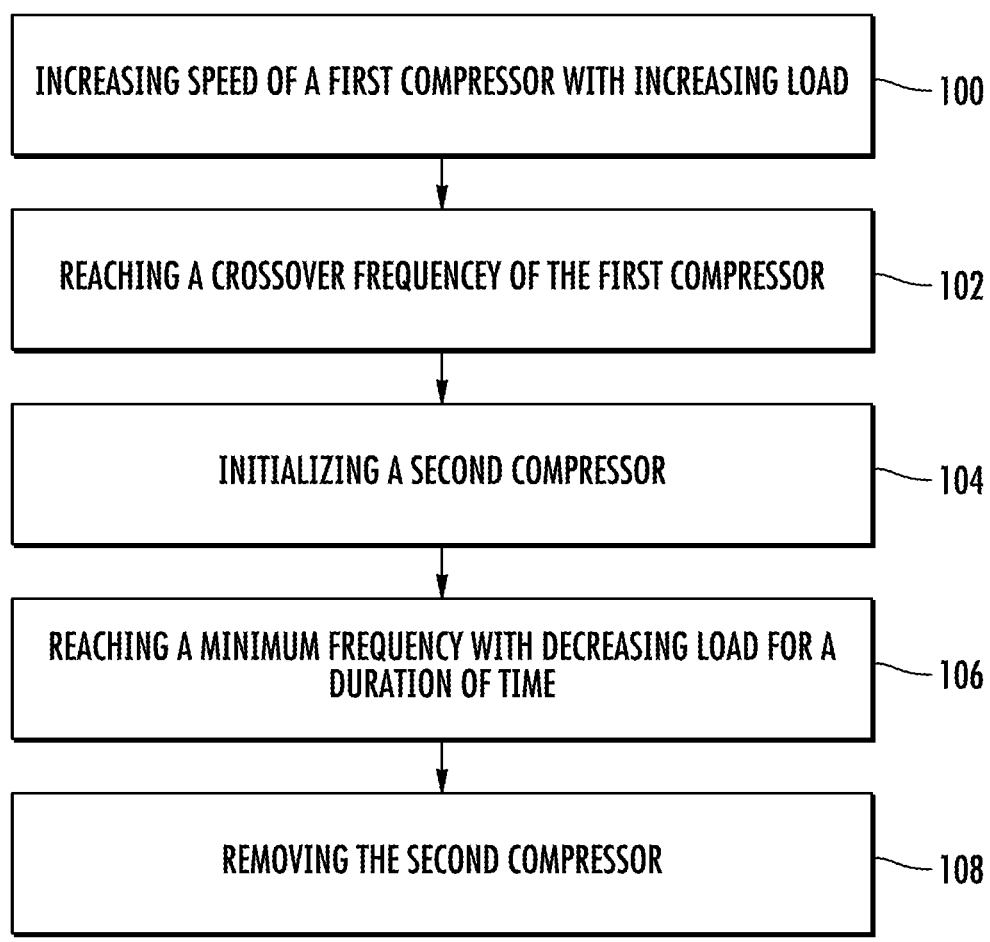
FIG. 2 is a flow chart of a method of operating the dual-compressor refrigeration unit.

Referring to FIG. 2 an operational flow chart is illustrated. In a first step 100, the cooling load demand upon the refrigeration unit 20 is increasing and thus the speed of the first compressor 24 is increasing as commanded by the controller 46 over pathway 84. In the next step 102, the controller 46 senses that a crossover frequency of the first compressor 24 is reached (i.e., representative of a crossover speed). In step 104, the controller 46 initializes the second compressor 34 via pathway 86. With decreasing cooling load and as step 106, the speed of both compressors 24, 34 decreases until a minimum frequency of the control circuit is reached for a pre-determined duration of time. Once this duration of time has lapsed, and as step 108, the controller 46 removes the second compressor 34 from operation.

Advantages of the present disclosure may include a loading scheme that provides efficient operation of a dual circuit refrigeration unit (i.e., dual compressors) while maintaining a heat transfer fluid (e.g., water) setpoint temperature. The loading scheme is generally compatible with various compressor sizes and maximum speeds in any product line. Mitigation of short cycling without a full loading criteria is minimized or eliminated.

While the present disclosure is described with reference to exemplary embodiments and an exemplary dual compressor system, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of operating a dual-compressor refrigeration unit comprising:
   increasing a first compressor speed as load demand increases; and
   initializing a second compressor when a frequency reaches a pre-established crossover frequency of the first compressor, wherein the first compressor is associated with a first condenser, and the second compressor is associated with a second condenser, and a first heat transfer fluid flows from the first condenser and into a common evaporator for chilling a second heat transfer fluid, and a third heat transfer fluid flows from the second condenser and into the common evaporator for chilling the second heat transfer fluid, and such that the first heat transfer fluid remains separate from the third heat transfer fluid, wherein the crossover frequency is dynamically controlled and computed based on a capacity and a maximum speed of the first compressor.

2. The method set forth in claim 1, wherein the crossover frequency is determined such that short cycling of the second compressor will not occur.

3. The method set forth in claim 2, wherein the crossover frequency is determined through execution of an algorithm established in-part through an efficiency analysis of the dual-compressor refrigeration unit.

4. The method set forth in claim 3, wherein the crossover frequency is dynamically controlled and computed based on a capacity and a maximum speed of the first compressor.

5. The method set forth in claim 1, wherein the second compressor is initialized before the first compressor reaches a maximum speed.

6. The method set forth in claim 1, wherein the first and third heat transfer fluids are a refrigerant and the second heat transfer fluid is liquid water.

7. The method set forth in claim 4, wherein the dual-compressor refrigeration unit includes a controller having a computer processor and a storage media for processing a pre-programmed algorithm associated with the control of the first and second compressors.

8. The method set forth in claim 5, wherein the first and second compressors do not run at respective minimum speeds when both are running.

9. The method set forth in claim 1 further comprising:
   turning off the second compressor when the frequency falls below a pre-determined minimum frequency for a pre-determined amount of time.

10. A refrigeration unit comprising:
    a first compressor constructed and arranged to compress a first refrigerant;
    a second compressor constructed and arranged to compress a second refrigerant;
    a first condenser operatively coupled to the first compressor;
    a second condenser operatively coupled to the second compressor;
    an evaporator constructed and arranged to separately flow the first and second refrigerants received from the respective first and second condensers for chilling a heat transfer fluid; and
    a controller including a computer processor and a storage media for executing a pre-programmed algorithm for initializing the second compressor when a predetermined crossover frequency of the first compressor is reached as a system load increases, wherein the crossover frequency is dynamically controlled and computed by the controller based on a capacity and a maximum speed of the first compressor.

11. The refrigeration unit set forth in claim 10, wherein the controller is configured to prevent the first and second compressors from running at respective minimum speeds when both compressors are initialized.

12. The refrigeration unit set forth in claim 10, wherein the crossover frequency is determined such that short cycling of the second compressor will not occur.

13. The refrigeration unit set forth in claim 12, wherein the crossover frequency is determined through execution of an algorithm established in-part through an efficiency analysis of the dual-compressor refrigeration unit.

14. The refrigeration unit set forth in claim 13, wherein the crossover frequency is dynamically controlled and computed by the controller based on a capacity and a maximum speed of the first compressor.

15. The refrigeration unit set forth in claim 10, wherein the controller is configured such that the second compressor is initialized before the first compressor reaches a maximum speed.

16. The refrigeration unit set forth in claim 10, wherein the first and second compressors comprise a screw-type.

* * * * *